United States Patent
Zapata et al.

(10) Patent No.: US 6,763,050 B2
(45) Date of Patent: Jul. 13, 2004

(54) METHOD FOR OPTICAL PUMPING OF THIN LASER MEDIA AT HIGH AVERAGE POWER

(75) Inventors: Luis E. Zapata, Livermore, CA (US); Raymond J. Beach, Livermore, CA (US); Eric C. Honea, Sunol, CA (US); Stephen A. Payne, Castro Valley, CA (US)

(73) Assignee: The Regents of the University of California, Oakland, CA (US)

( * ) Notice: Subject to any disclaimer, the term of this patent is extended or adjusted under 35 U.S.C. 154(b) by 187 days.

(21) Appl. No.: 09/771,393

(22) Filed: Jan. 26, 2001

(65) Prior Publication Data

US 2002/0039377 A1 Apr. 4, 2002

Related U.S. Application Data

(60) Provisional application No. 60/190,131, filed on Mar. 16, 2000.

(51) Int. Cl.[7] .............................................. H01S 3/091
(52) U.S. Cl. .............................. 372/70; 372/75; 372/49; 372/99
(58) Field of Search ............................................ 372/70

(56) References Cited

U.S. PATENT DOCUMENTS

| | | | | |
|---|---|---|---|---|
| 4,764,933 A | * | 8/1988 | Kozlovsky et al. | 372/40 |
| 4,847,851 A | * | 7/1989 | Dixon | 372/75 |
| 5,105,429 A | | 4/1992 | Mundinger et al. | 372/34 |
| 5,105,430 A | | 4/1992 | Mundinger et al. | 372/35 |
| 5,307,430 A | | 4/1994 | Beach et al. | 385/31 |
| 5,521,932 A | * | 5/1996 | Marshall | 372/36 |
| 5,548,605 A | | 8/1996 | Bennett et al. | 372/36 |
| 5,555,254 A | * | 9/1996 | Injeyan et al. | 372/33 |
| 5,689,522 A | | 11/1997 | Beach | 372/75 |
| 2002/0094007 A1 | * | 7/2002 | Peterson et al. | 372/92 |

OTHER PUBLICATIONS

A. Giesen et al; Scalable Concept for Diode–Pumped High–Power Solid–State Lasers; Jan. 31, 1994; p365–372; Appl. Phys. B58.

R. J. Beach et al, High–Power Diode–Pumped Lasers; Jun. 2, 1996; Conference on Lasers and Electro–Optics; vol. 9; 1996 Technical Digest Series Conference Edition.

* cited by examiner

*Primary Examiner*—Paul Ip
*Assistant Examiner*—Dung T Nguyen
(74) *Attorney, Agent, or Firm*—John P. Wooldridge; Alan H. Thompson

(57) ABSTRACT

A thin, planar laser material is bonded to a light guide of an index-matched material forming a composite disk. Diode array or other pump light is introduced into the composite disk through the edges of the disk. Pump light trapped within the composite disk depletes as it multi-passes the laser medium before reaching an opposing edge of the disk. The resulting compound optical structure efficiently delivers concentrated pump light and to a laser medium of minimum thickness. The external face of the laser medium is used for cooling. A high performance cooler attached to the external face of the laser medium rejects heat. Laser beam extraction is parallel to the heat flux to minimize optical distortions.

32 Claims, 3 Drawing Sheets

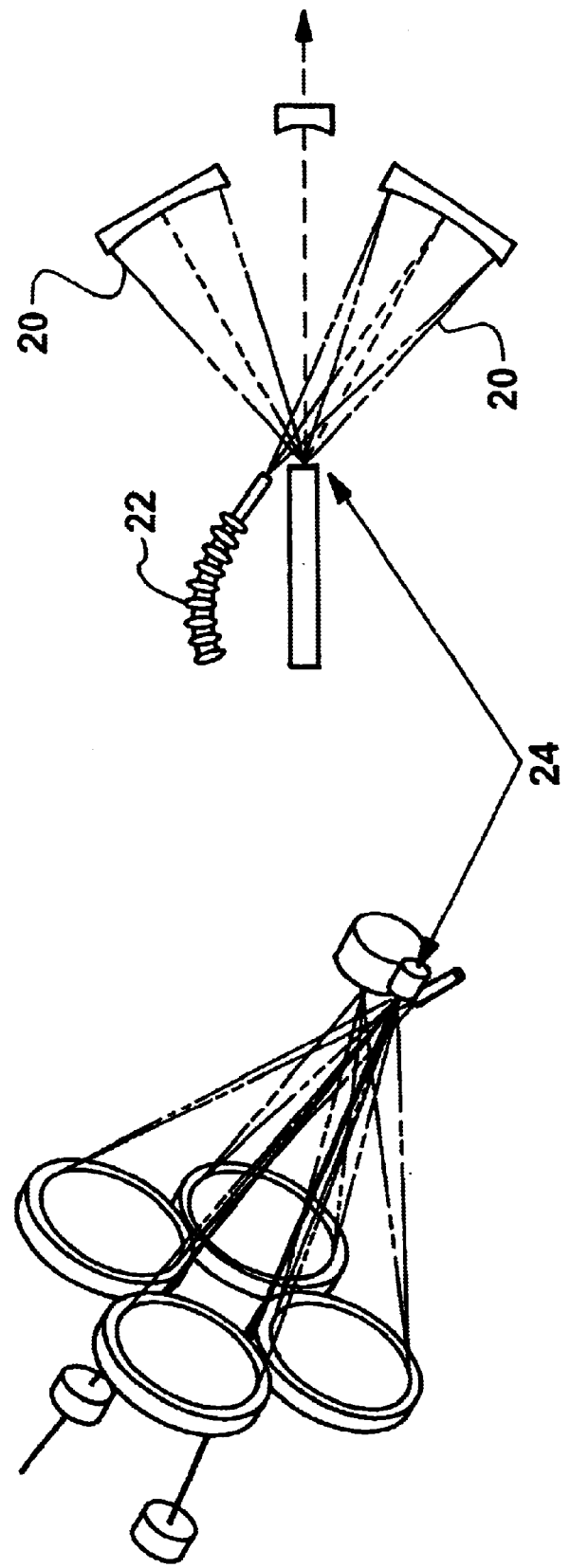

2

METHOD FOR OPTICAL PUMPING OF THIN LASER MEDIA AT HIGH AVERAGE POWER

This application claims priority to U.S. Provisional Patent Application Serial No. 60/190,131 titled "Method for Optical Pumping of Thin Laser Media at High Average Power," filed Mar. 16, 2000 and incorporated herein by reference.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to the performance of high average power solid-state lasers, and more specifically, it relates to techniques for optically pumping thin solid-state laser media.

2. Description of Related Art

The performance of high average power solid-state lasers is in large part determined by the geometry of pump light delivery to the gain medium and on the intensive cooling that must accompany it. For example, some devices utilize pump light impinging on a face of a slab or along the barrel of a rod in a geometry commonly referred to as side pumping. In some cases, it is desirable to utilize an end-pumping geometry in order to achieve high delivery efficiency. An example of such a case arises when the absorption length of the laser material is limited. Side pumping and end pumping schemes rely on side cooling. Side cooling induces stress and optical deformations that limit the quality and ultimately the level of output power possible by either end or side pumping schemes.

Thin disk or active mirror configurations have recently been demonstrated at continuous wave output powers exceeding 1 kW with the promise of very high beam quality. Today, the dominant development of this type of laser is being pursued at the University of Stuttgart in a group headed by Prof. Adolf Geissen. See A. Giesen, H. Hugel, A. Voss, K. Wittig, U. Brauch, H. Opower, "Scalable Concept for Diode-Pumped High-Power solid-State Lasers", App. Phys. B, 58, 365–372 (1994). The fundamental idea of the approach, which enables the generation of high average power with high beam quality, is illustrated in FIG. 1 where it is seen that the thermal gradients 10 in the laser disk 12 are arranged to be parallel to the laser radiation 14 propagation direction from disk laser 12. In the figure, the thermal gradient 10 is arranged in this manner to avoid phase aberrations on the laser beam 14.

By keeping the thermal gradients parallel to the beam propagation direction, to first order, thermal aberrations cannot impart a phase aberration on the laser beam. To understand the average power scaling potential of this approach, one then needs only to consider the maximum thermal power that can be generated in the laser crystal without fracture. In a first approximation, the maximum laser output power that can be generated is proportional to the maximum thermal power dissipation that can be handled by the laser crystal. The laser output power per unit area $P_{laser}$ is proportional to the fracture strength of a thin disk, which varies inversely as the thickness of the disk, which leads to the following scaling law, $$P_{laser} \propto \frac{1}{t}$$

where t is the thickness of the thin disk. So, to maximize the average power capability, one is driven to use very thin disks. This in turn drives one to develop multipass pump geometries because the use of thin disks implies very short pump absorption distances. In the very thin gain samples necessary to avoid fracture under intense pumping, the pump beam is re-imaged through the sample up to 16 times in the Stuttgart approach to increase the net absorption path. The very complicated pump geometry (FIG. 2) that this necessitates, and the obvious limitations to high average power scaling that it imposes, are issues that the present thin disk concept recognizes and addresses. FIG. 2 shows the thin disk geometry developed by the Stuttgart group in which the pump radiation 20 from a pump fiber bundle 22 is multipassed through the thin disk sample 24 to increase absorption.

The growth of ASE is another feature of the presently pursued Stuttgart thin disk technology that limits its average power scaling potential. As shown in FIG. 3, because the thin disk 30 laser gain has to be sufficient to support efficient lasing in its thin direction, the transverse size of the gain region is limited due to the onset of parasitic lasing 32. The main reason for this sensitivity to ASE in the presently pursued Stuttgart thin disk approach is the large solid angle that is confined by total internal reflection (TIR) at the top surface 34 of the gain element. Due to TIR at the top surface, very long path rays can be confined within the gain loaded sample and effectively compete against the extracting laser beam for the gain media's stored energy. The present composite thin disk concept recognizes and addresses this issue. FIG. 3 illustrates the sensitivity of the thin disk architecture being pursued by the Stuttgart group to ASE and parasitic lasing because of the large solid angle confined within the gain medium at the Yb:YAG-air interface.

SUMMARY OF THE INVENTION

It is an object of the present invention to provide methods and apparatuses by which the pump absorption length limitation can be circumvented.

It is another object to optically pump a thin sheet of laser material with high delivery efficiency while exposing one of the large faces of the gain medium for cooling.

These and other objects and advantages of the present invention will become apparent from the following description and accompanying drawings.

The invention relies on bonding of a thin disk of laser material to a similar disk of a material closely matched in refractive index so that pump light introduced through edges of the composite structure is trapped and passes through the gain medium repeatedly. The approach is better described as edge pumping with face cooling. High absorption is possible using moderate concentrations of dopant while minimizing the laser medium thickness.

A key aspect of this invention is the efficient delivery of pump light to a thin-disk laser medium of minimum thickness. This maximizes the laser output because in face-cooled disk geometry, for a prescribed maximum peak surface stress (that avoids fracture), the thinner the disk the higher the heat flux it will manage.

An optical advantage is also gained from the "thinness" of the laser gain medium in that the fraction of spontaneous emission that remains within the solid angle of the gain medium is proportional to the square of the thickness of the gain medium. Amplified spontaneous emission (ASE) limits the transverse dimensions of an aperture in complex ways related to the geometric details surrounding the gain medium. However, in general, if the detailed geometry is designed properly, a larger transverse aperture is possible with thinner laser medium dimensions.

The present invention utilizes all of the embodiments of U.S. patent application Ser. No. 09/237,142, titled "High Average Power Scaleable Thin-Disk Laser" by Beach et al., filed Jan. 25, 1999 and incorporated herein by reference. Embodiments of lens duct designs usable in the present invention are described in U.S. Pat. No. 5,307,430, which is incorporated herein by reference.

BRIEF DESCRIPTION OF THE DRAWINGS

FIG. 2 shows the thin disk geometry developed by the Stuttgart group in which the pump radiation from a pump fiber is multipassed through the thin disk sample to increase absorption.

DETAILED DESCRIPTION OF THE INVENTION

Figure 1:
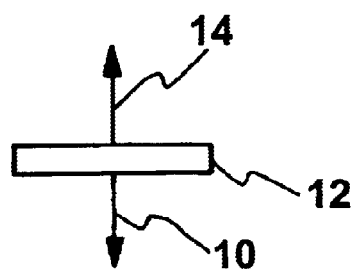
FIG. 1 is a prior art illustration of a laser disk's thermal gradient arranged to be parallel to the laser radiation propagation direction.
Figure 3:
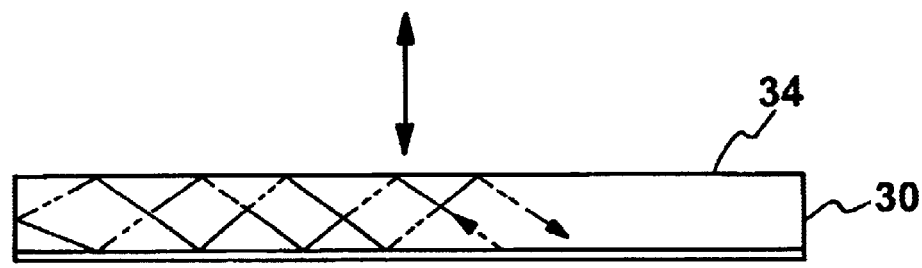
FIG. 3 illustrates the sensitivity of the thin disk architecture being pursued by the Stuttgart group to ASE and parasitic lasing because of the large solid angle confined at the YAG-air interface.
Figure 4:
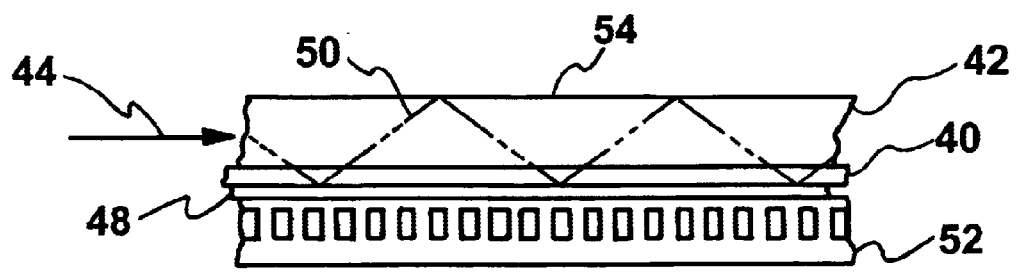
FIG. 4 is the basic geometry of an embodiment of the present invention that provides strong excitation and simultaneous cooling of a laser gain medium within a light trap of substantially equal index of refraction.

FIG. 4 is the basic geometry of an embodiment of the present invention and provides strong excitation and simultaneous cooling of a laser gain medium within a light trap of substantially equal index of refraction. Light introduced at the edges of the device is trapped between the top and bottom surfaces of the composite disk whereby pump light passes through the laser gain medium repeatedly, energizing it. The key aspects of the present invention are represented in this figure. The composite structure includes a laser gain medium 40 bonded to a disk 42 of the same shape, which has substantially the same index of refraction. A difference Δn between the gain medium and the optically passive capping layer can be tolerated. This difference can be found from the requirement that any ray traveling transversely does not totally internally reflect (TIR) at the interface between the bonded media. Therefore the angle subtended by one thickness of the gain medium across the longest dimension of the aperture defines the maximum critical angle for total internal reflection that can be allowed. If t is the gain medium thickness and s the longest path found across the aperture, the relationship:

$$\Delta n/n = \cos(t/s) - 1$$

defines mathematically the index difference, where the lower index is found in the thin gain medium. The index matched layer comprises an index of refraction difference Δn with respect to the index of refraction n of the laser gain medium, where Δn/n is less than or equal to $\cos(t/s)-1$, where t is the thickness of said laser gain medium and s is the longest path found across the aperture. A copious amount of pump light from a pump source 44 is introduced through the edge(s) of the device. Preferably, the pump light is optically conditioned so directionality is provided and so that it will be trapped by total internal reflection. The external surface of the laser gain medium is coated with a high reflector layer 48 at the laser wavelength and also at the pump wavelength. A dashed line 50 exemplifies the repeated passes a representative pump ray makes through the laser gain medium. The advantage of using a doped/undoped composite disk is that the undoped layer 42 has a thickness that is adjusted to accept the amount of pump light required for the desired output power (the radiance or beam quality of the pump light limits concentration or, how small an opening it can traverse), the doped layer 40 thickness and length are adjusted to adequately absorb pump light while keeping the inversion density high for efficient laser extraction and the surface stress caused by heat gradients within limits. A computer program is utilized for optimizing the gain medium thickness and length.

The exposed external face of the laser gain medium at the high reflector layer 48 is soldered to a high performance cooler 52 to remove excess heat. An example of a cooler that can be used in the present invention is the microchannel cooler used in cooling high power diodes. Coolers usable in the present invention are disclosed in U.S. Pat. No. 5,105,429, titled "Modular Package For Cooling A Laser Diode Array", incorporated herein by reference, U.S. Pat. No. 5,105,430, titled "Thin Planar Package For Cooling An Array Of Edge-Emitting Laser Diodes", incorporated herein by reference, and U.S. Pat. No. 5,548,605, titled "Monolithic Microchannel Heatsink", incorporated herein by reference. An impingement cooler or a spray cooler can also be employed. A simple copper cooler can also be employed for applications requiring less output power.

In one embodiment of this invention, the laser is extracted normal to the planar laser medium. The high reflector layer 48 can comprises a high reflector (HR) thin-film stack that reflects the laser wavelength at the laser beam extraction angle. A film of a suitable material such as gold or silver is deposited on the back or the HR stack that reflects the pump light back into the light-guide. The top surface 54 can incorporate a thin-film designed to be anti-reflective (AR) at the laser wavelength Preferably the pump light radiance is distributed within the total internal reflection cone determined by the refractive index step at the top surface interface. If it is convenient that the pump radiance have significant power distributed over a solid angle beyond the total internal reflection solid angle, a dichroic mirror that reflects the pump and transmits the laser wavelength may be used to improve efficiency.

An embodiment of the present invention is a thin disk laser design that is a side pumped light-guided/gain-medium diffusion bonded composite that is strikingly robust and resolves prior difficulties with high average power pumping/cooling and the rejection of amplified spontaneous emission (ASE). The crucial design ideas have been proven experimentally. In contrast to high power rods or slabs, the one-dimensional nature of the cooling geometry and the edge-pump geometry scale gracefully to very high average power.

Figure 5:
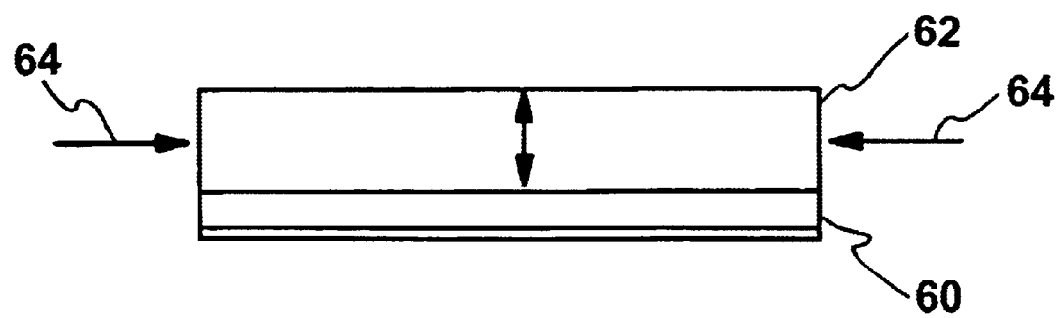
FIG. 5 depicts another view of the basic thin disk approach of the present invention, which enables average power scaling of the thin disk concept to the 10 kW average power level from a single contiguous aperture.

FIG. 5 depicts another view of the basic thin disk approach of the present invention, which enables average power scaling of the thin disk concept to the 10 kW average power level from a single contiguous aperture. The present approach differs significantly from the Stuttgart approach in that on top of the thin disk gain loaded layer 60 there is an index matched undoped layer 62 that is attached using diffusion bonding. This invention exploits this diffusion bonding technology to manufacture composite laser samples for both improved optical and thermal performance of laser systems. See R. J. Beach, S. B. Sutton, J. A. Skidmore, and M. A. Emanuel, "High Power 2 µm Wing-pumped Tm:YAG Laser", Technical Digest for 1996 Advance Solid State Lasers, p 249 (1996), incorporated herein by reference. See also U.S. Pat. No. 5,689,522, titled "High Efficiency 2 Micrometer Laser Utilizing Wing-Pumped $Tm^{3+}$ And A Laser Diode Array End-Pumping Architecture" incorporated herein by reference. In the present invention, the purpose of the undoped layer is two fold. First, it provides for practical side-pumping (64) of the thin disk using a transverse or side-pumping geometry by allowing a larger input area where much pump light can be introduced within the limits of the brightness theorem. Second, it allows ASE rays that are traveling upward in the gain-loaded portion of the structure to freely propagate out of the gain-loaded region and into the undoped region. By properly adjusting the thickness of the capping layer, it is possible to greatly reduce the maximum trapped path length of ASE rays in the gain loaded portion of the composite laser element, and thus substantially reduce the impact of ASE on the gain loaded structure. Another important advantage provided by the isothermal, undoped layer is that of providing a stiff backbone for resisting mechanical distortions. The undoped layer serves the dual function of allowing ASE rays to escape from the top surface of the thin disk as well as serving as a pump delivery-cladding region.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

We claim:

1. A laser, comprising:
   a solid-state laser gain medium having a first surface and a second surface opposite to and substantially parallel with said first surface, wherein said solid state laser gain medium comprises an optical axis that is not parallel with said first surface and said second surface;
   an index matched layer attached to said first surface of said laser gain medium, wherein said index matched layer comprises about the same index of refraction as said laser gain medium and further comprises at least one edge that is not parallel with said first surface; and
   means for optically pumping said index matched layer from said at least one edge, wherein pump light does not pump said gain medium along or parallel to said optical axis, wherein said pump light is transmitted into said index matched layer and is then transmitted from said index matched layer into said solid-state laser gain medium to optically pump said solid-state laser gain medium.

2. The laser of claim 1, wherein said index matched layer is optically pumped from two or more edges.

3. The laser of claim 1, wherein said index matched layer comprises an index of refraction difference $\Delta n$ with respect to the index of refraction n of said laser gain medium, wherein $\Delta n/n$ is less than or equal to $\cos(t/s)-1$, wherein t is the thickness of said laser gain medium and s is the longest path found across the aperture.

4. The laser of claim 1, wherein said laser gain medium comprises an index of refraction that is lower than the index of refraction of said index matched layer.

5. The laser of claim 1, further comprising a reflective layer attached to said second surface of said laser gain medium.

6. The laser of claim 1, wherein said index matched layer has a thickness that is adjusted to adequately trap the pump light, and wherein said gain medium has a thickness and length that are adjusted to adequately absorb the pump light.

7. The laser of claim 1, wherein said index matched layer has a thickness that is adjusted to accept the amount of pump light required for the desired output power.

8. The laser of claim 1, wherein said gain medium has a thickness and length that are adjusted to adequately absorb pump light while keeping the inversion density high for efficient laser extraction and the surface stress caused by heat gradients within limits.

9. The laser of claim 1, wherein said solid-state laser gain medium comprise a disk.

10. The laser of claim 1, wherein said solid-state laser gain medium comprises a slab.

11. The laser of claim 1, further comprising means for cooling said laser.

12. The laser of claim 11, further comprising a reflective layer attached to said second surface of said laser gain medium, wherein said means for cooling said laser comprises a microchannel cooler attached to said reflective layer.

13. The laser of claim 12, wherein said microchannel cooler comprises a high performance microchannel cooler.

14. The laser of claim 5, wherein said reflective layer comprises a high reflector thin-film stack that reflects the laser wavelength at the laser beam extraction angle.

15. The laser of claim 14, wherein said high reflector thin-film stack comprises at least one layer selected from the group consisting of copper, gold and silver.

16. The laser of claim 1, wherein said index matched layer comprises an anti-reflective coating designed to transmit the laser wavelength.

17. The laser of claim 1, further comprising an output coupler positioned to reflect pump light and transmit light from said laser.

18. The laser of claim 1, wherein said index matched layer and said laser gain medium are diffusion bonded together.

19. A method for operating a laser, comprising:
   providing a solid-state laser gain medium having a first surface and a second surface opposite to and substantially parallel with said first surface, wherein said solid state laser gain medium comprises an optical axis that is not parallel with said first surface and said second surface;
   providing an index matched layer attached to said first surface of said laser gain medium, wherein said index matched layer comprises about the same index of refraction as said laser gain medium and further comprises at least one edge that is not parallel with said first surface; and
   optically pumping said index matched layer from said at least one edge, wherein pump light does not pump said gain medium along or parallel to said optical axis, wherein said pump light is transmitted into said index matched layer and is then transmitted from said index matched layer into said solid-state laser gain medium to optically pump said solid-state laser gain medium.

20. The method of claim 19, further comprising cooling said laser.

21. A method of fabricating a laser, comprising:

providing a solid-state laser gain medium having a first surface and a second surface opposite to and substantially parallel with said first surface, wherein said solid state laser gain medium comprises an optical axis that is not parallel with said first surface and said second surface;

attaching an index matched layer to said first surface of said laser gain medium, wherein said index matched layer comprises about the same index of refraction as said laser gain medium and further comprises at least one edge that is not parallel with said first surface; and providing means for optically pumping said index matched layer from said at least one edge, wherein pump light does not pump said gain medium along or parallel to said optical axis, wherein said pump light is transmitted into said index matched layer and is then transmitted from said index matched layer into said solid-state laser gain medium to optically pump said solid-state laser gain medium.

22. The method of claim 21, further comprising designing said index matched layer to have an index of refraction difference $\Delta n$ with respect to the index of refraction n of said laser gain medium, wherein $\Delta n/n$ is less than or equal to $\cos(t/s)-1$, where t is the thickness of said laser gain medium and s is the longest path found across the aperture.

23. The method of claim 22, wherein said laser gain medium is designed to have an index of refraction that is lower than the index of refraction of said index matched layer.

24. The method of claim 21, further comprising attaching a reflective layer to said second surface of said laser gain medium.

25. The method of claim 21, further comprising designing the thickness of said index matched layer so that said index matched layer adequately traps pump light, the method further comprising designing the thickness and length of said gain medium so that said gain medium adequately absorbs pump light.

26. The method of claim 21, further comprising designing said index matched layer so that said index matched layer has a thickness that accepts the amount of pump light required for the desired output power.

27. The method of claim 21, further comprising designing said gain medium to have a thickness and length that adequately absorbs pump light while keeping the inversion density high for efficient laser extraction and the surface stress caused by heat gradients within limits.

28. The method of claim 21, further comprising providing means for cooling said laser.

29. The method of claim 21, further comprising attaching a reflective layer to said second surface of said laser gain medium, further comprising attaching a microchannel cooler to said reflective layer, wherein said microchannel cooler is used for cooling said laser.

30. The method of claim 21, further comprising attaching an anti-reflective coating to said index matched layer, wherein said an anti-reflective coating transmits the laser light emitted by said laser.

31. The method of claim 21, further comprising providing an output coupler positioned to reflect pump light and transmit light from said laser.

32. The method of claim 21, further comprising diffusion bonding said index matched layer and said laser gain medium together.

* * * * *